April 14, 1964   D. A. WALTHER   3,129,034
WHEELS FOR VEHICLES
Filed July 31, 1962   2 Sheets-Sheet 2
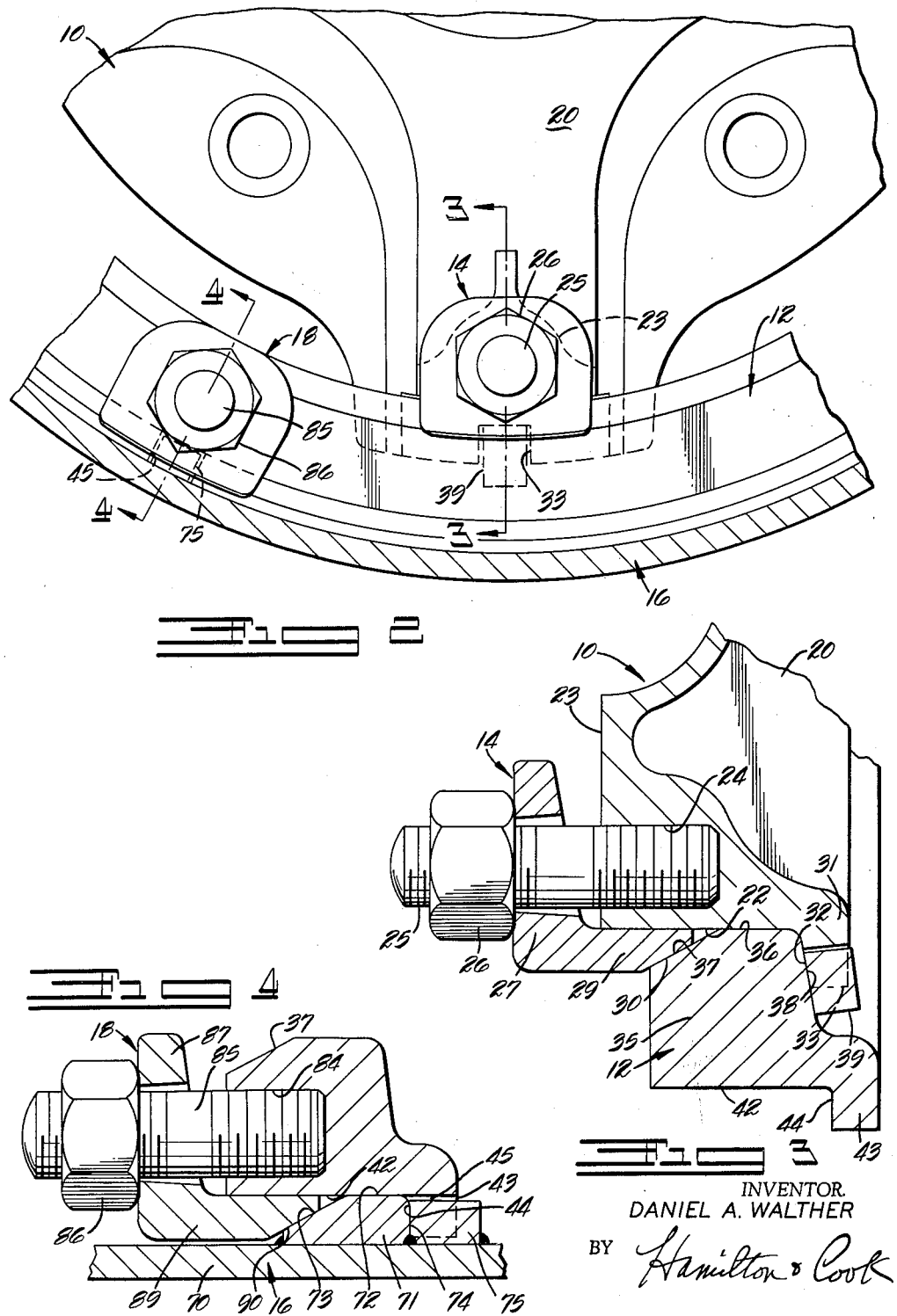
INVENTOR.
DANIEL A. WALTHER
BY Hamilton & Cook
ATTORNEYS.

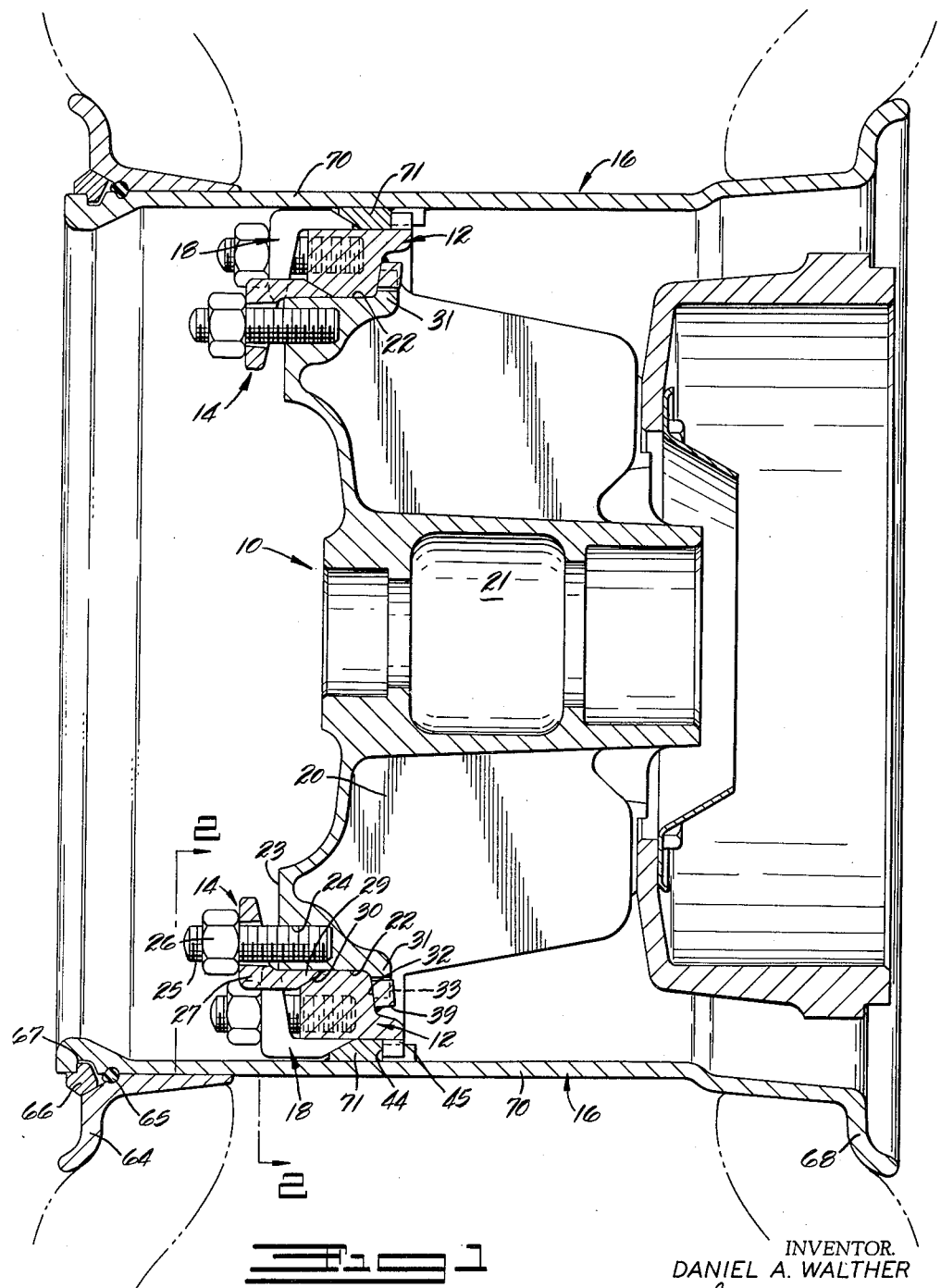

# United States Patent Office 3,129,034
Patented Apr. 14, 1964

3,129,034
WHEELS FOR VEHICLES
Daniel A. Walther, Dayton, Ohio, assignor to The Dayton Steel Foundry Company, Dayton, Ohio, a corporation of Ohio
Filed July 31, 1962, Ser. No. 213,796
2 Claims. (Cl. 301—12)

The present invention relates to improvements in automotive or vehicle wheels. More particularly, the invention relates to vehicle wheels used for the mounting of one type of rim and tire which may be adapted or converted for the mounting of larger and different types of rims and tires.

Recently, the tire and vehicle art has seen developments and innovations in the relatively "wide bead" or "wide base" truck or vehicle tire. The rim and wheel industry, of which applicant's assignee is a member, has contributed new concepts for the successful utilization and mounting of the wide bead tire. It is now apparent that the design for a wheel, to be used with wide rims for mounting wide bead tires, is becoming standard. However, present information indicates that there may be technical problems inherent in the use of wide bead tires which under certain conditions will require the use of a different type rim with larger diameter tires. A further consideration is that it may be several years before large quantities of wide bead tires are commercially available in a full range of sizes and diameters.

Therefore, it is an object of the present invention to provide concepts and mechanical elements whereby a vehicle wheel normally used for the mounting of a smaller diameter (e.g., 19½") rim and wide bead tire, may be converted for the mounting of a substantially larger diameter (e.g., 21") rim and tire. Further, it is an object to accomplish this adaptation or conversion in a manner which is structurally sound and which provides a wheel mounting for large diameter rims in which all requirements such as concentricity, radial and lateral alignment, run out, force transmission and other technical considerations are fully met.

These and other objects of the invention, as well as the advantages thereof, will be apparent in view of the following detailed description and the attached drawings.

In the drawings:
FIG. 1 is a transverse section showing a wheel, adapter, clamp lugs and large diameter rim, all according to the invention;
FIG. 2 is a fragmentary side view, taken substantially as indicated on line 2—2 of FIG. 1;
FIG. 3 is an enlarged section, taken substantially as indicated on line 3—3 of FIG. 2, showing details of the wheel felly surfaces, the annular adapter and the radially inner series of clamp lugs securing the adapter to the wheel;
FIG. 4 is another enlarged section, taken substantially as indicated on line 4—4 of FIG. 2, showing details of the adapter felly surface, the large diameter rim, and the radially outer series of clamp lugs securing the rim to the adapter.

In general, the invention relates to a wheel 10 having a felly surface of short axial width on the outward ends of the spoke members. Seated around the wheel felly surfaces is an annular adapter 12 having a circumferentially continuous felly surface. Clamp means or a first series of bolt supported fasteners or clamp lugs 14 secure the adapter 12 to the wheel 10. A conventional flat base rim 16 having a diameter substantially greater than the diameter of the wheel felly is seated on the felly surface of the adapter 12. Additional clamp means or a second series of bolt supported clamp lugs 18 secure the rim 16 to the adapter 12.

Referring to FIG. 1, a wheel 10 may have any desired number of spoke members 20, extending radially from a hub area 21 with brake drum terminating at their outer ends in an accurately machined load bearing or felly surface 22. The felly surface 22 is relatively narrow, having a short axial width, and is primarily designed and intended for the mounting of a relatively wide rim such as used in conjunction with the recently developed "wide bead" or "wide base" truck or vehicle tires but having a diameter substantially smaller than the diameter of rim 16. The axially outer face of the terminal portion of each spoke member 20 is provided with a boss 23 having a threaded bore 24 for attachment of a clamp lug 14 as by a stud bolt 25 and nut 26.

Each clamp lug 14 has a radially oriented upright leg 27 with a slot for the supporting bolt 25. The horizontal leg or lateral portion 29 of a clamp 14 extends axially inward along the face of each wheel felly surface 22 and terminates in an axially inward radially inclined conical surface of face 30 for wedging engagement with the axially outer side of the base portion of an adapter 12. The clamp face 30 is bevelled at a standard angle, e.g., approximately 28° as shown.

The axially inner end of each relatively narrow felly surface 22 is terminated abruptly by a radially outwardly directed flange portion 31. The axially outer face of each flange 31 is accurately machined to provide a stop or location surface 32 for the base portion of an adapter 12. The surface 32 is preferably oriented substantially perpendicularly to the rotational axis of the wheel 10, for example, at a vertical angle of 80–90°, substantially as shown.

Each spoke flange 31 also preferably has at least one driving notch 33 extending through the flange and surface 32 on the axial center line of each felly surface 22. The floor of each notch 33 is preferably parallel to the felly surface and the side walls are preferably perpendicular to the felly surface. However, the depth, axial position and exact shape of each notch 33 is not critical so long as the notches extend axially of the wheel flange 31 a distance sufficient to provide positive driving surfaces to engage a driving lug of an adapter 12, as described below. Further, each wheel flange may have more than one notch 33, in which event element 33 could be considered as a driving "lug," with relieved areas on either side.

The adapter 12 is an annular, circumferentially continuous member preferably fabricated from a metal casting machined to the configurations as described herein. As best shown in FIG. 3, the radially inward portion of an adapter 12 is formed to provide a base or load bearing portion 35 having substantial thickness. The radially inner face of a base portion 35 is flat and horizontal to provide an annularly continuous axially extending surface 36 for seating on the machined felly surfaces 22 of a wheel 10.

The axially outer edge of an adapter base portion 35 is radially inclined at a standard angle (e.g., 28°) to provide an annularly continuous surface 37 for wedging engagement by the bevelled surface of each clamp lug 14.

The axially inner side of an adapter base portion 35 is radially oriented at a suitable angle to provide an annularly continuous surface 38 for mating engagement against the machined surface 32 of each spoke flange 31.

To provide a positive drive of the adapter 12 by the wheel 10, the axially inner side of an adapter base portion 35 preferably carries at least one driving lug 39 suitably spaced and shaped to selectively engage and positively interlock with one of the driving notches 33 of the wheel 10. The spacing of a lug 39 laterally from the base portion 35; and the length of a lug 39, is not critical, so long as the lug extends axially of the adapter a distance sufficient to provide positive driving surfaces to engage the wheel notches 33. Further, if the wheel notches are so formed as to be considered driving "lugs," an element 39 could be considered as a driving "notch," with a relieved area in the middle.

The radially outer face of an adapter 12 is machined to provide a preferably circumferentially continuous outer load bearing surface 42 providing a felly for mounting of the rim 16. The felly surface 42 has an axial width substantially the same as the axial width of the wheel felly surfaces 22. The axially inner end of the felly surface 42 is terminated abruptly by a radially outwardly directed flange portion 43. The axially outer face of the flange 43 is accurately machined to provide a stop or location surface 44 for a base portion of the rim 16. The surface 44 is preferably oriented substantially perpendicularly to the rotational axis of the adapter 12, for example, at a vertical angle of 80–90°, substantially as shown.

At spaced intervals, the adapter flange 43 preferably has a series of driving notches 45 extending through the flange and surface 44. The floor of each notch 45 is preferably parallel to the felly surface 42 and the side walls are preferably perpendicular to the felly surface. However, as stated above with respect to the wheel felly notches 33, the depth, axial position and exact shape of each notch 45 is not critical. Also, the notches 45 could be considered as driving "lugs," with relieved areas on either side.

Referring to FIG. 1, a rim 16 is of an improved "flat base" type, and could be used, for example, for mounting wide bead tires having a radial diameter of 21". The axially outer side of a rim 16 has a removable bead flange 64, air seal 65, if the rim 16 is to mount a "tubeless" tire, and lock ring 66 interfitting with a lock flange 67. The axially inner side of a rim 16 has a fixed bead flange 68.

Between the flanges 67 and 68, the web or base portion of a rim 16 has a laterally extending portion 70 carrying a radially inwardly directed medial rib or load bearing member 71. As best shown in FIG. 4, the radially inner face of a rib member 71 is flat and horizontal to provide an annularly continuous axially extending surface 72 for seating on the felly surface 42 of an adapter 12.

The axially outer edge of the rim member 71 is radially inclined at a standard angle (e.g., 28°) to provide an annularly continuous surface 73 for wedging engagement with a clamp 18, as described below.

The axially inner side of the rim member 71 is radially oriented at a suitable angle to provide an annularly continuous surface 74 for mating engagement against the surface 44 of the adapter flange 43.

To provide a positive drive of the rim 16 by the adapter 12 when mounted on the wheel 10, the axially inner side or face of the rim member 71 preferably carries at least one driving lug 75 suitably spaced and shaped to selectively engage and positively interlock with one of the driving notches 45 of the adapter 12. As stated above with respect to the adapter lugs 39, the spacing and length of a lug 75 is not critical. Also, a lug 75 could be considered as a driving "notch," with a relieved area in the middle.

As shown in FIG. 4, the axially outer face of the adapter 12 has a series of threaded bores 84 for attachment of the clamp lugs 18 as by a stud bolt 85 and nut 86. It is preferred that there be at least two clamp lugs 18 for each spoke member 20 of the wheel 10. As shown in FIG. 2, the clamp lugs 18 are positioned between the spoke members.

Each clamp lug 18 is similar to the clamp lugs 14 described above, having an upright leg 87 with a slot for the bolt 85. The horizontal leg 89 of a clamp 18 extends axially inward along the face of the adapter felly surface 42 and terminates in a face 90 bevelled for wedging engagement with the radially inner surface 73 of the rim 16.

Summary

The concepts of the invention readily permit the conversion of a wheel 10 for use in the mounting of larger diameter rims. The adapter 12 may be used, or removed, as required to mount a larger diameter rim on a wheel 10 having a felly surface (22) of substantially smaller diameter than mounting diameter of the rim.

It will be apparent that the above details are exemplary only. For example, a large diameter "drop center" type rim could be mounted on the adapter felly surface 42. Also, the clamp lugs 14 and 18 could have a construction different in details from that shown. Therefore, the true spirit and scope of the invention should be determined solely by the scope of the claims.

What is claimed is:

1. The combination of:
   a wheel having a plurality of spoke members, a felly surface on the radially outer end of each spoke member, and a flange portion (31) on the axially inner end of each felly surface, each flange portion having a surface (32) oriented substantially perpendicularly to the rotational axis of said wheel;
   an annular adapter having a radially inner base portion (35), said base portion having a continuous axially extending surface (36) seating on said wheel felly surfaces and a continuous radially oriented surface (38) seating against the substantially perpendicular surfaces of said wheel flange portions, the radially outer portion of said adapter having a circumferentially continuous felly surface;
   a first series of clamp lugs supported by bolts (25) on the axially outer face of said spoke members, each said clamp lug having a lateral leg (29) wedged between a wheel felly surface and the axially outer side of the base portion of said adapter;
   a wide base rim having a medial load bearing member seated on the adapter felly surface, and a second series of clamp lugs supported by bolts (85) on the axially outer face of said adapter, each said clamp lug having a lateral leg (89) wedged between said adapter felly surface and a radially inner portion of said rim load bearing member.

2. The combination of:
   a wheel having a plurality of spoke members, a felly surface on the radially outer end of each spoke member, a flange portion on the axially inner end of each felly surface, and a notch (33) extending axially inward of each flange portion from said felly surface;
   an annular adapter having a radially inner base portion seated on each felly surface and against said flange portion, the axially outer edge of said base portion having a radially inclined surface (37), the axially inner face of said base portion having a plurality of lugs (39) selectively interfitting with said wheel notches, and a radially outer portion defining a felly surface having axial width substantially the same as the width of said wheel felly surface;
   a first series of clamp lugs supported by bolts on the axially outer face of said spoke members, each said clamp lug having a lateral leg wedged between said wheel felly surfaces and the radially inclined surface on said adapter base portion;
a wide base rim having a media load bearing member seated on the adapter felly surface;
and a second series of clamp lugs supported by bolts on the axially outer face of said adapter, each said clamp lug having a lateral leg wedged between said adapter felly surface and a radially inner portion of said rim load bearing member.

References Cited in the file of this patent

UNITED STATES PATENTS

| 1,299,541 | Baker | Apr. 8, 1919 |

FOREIGN PATENTS

| 18,287 | Australia | May 29, 1935 |
| 337,390 | Italy | Mar. 3, 1936 |
| 405,345 | Italy | Aug. 6, 1943 |
| 982,468 | France | Jan. 31, 1951 |

UNITED STATES PATENT OFFICE
CERTIFICATE OF CORRECTION

Patent No. 3,129,034            April 14, 1964

Daniel A. Walther

It is hereby certified that error appears in the above numbered patent requiring correction and that the said Letters Patent should read as corrected below.

Column 2, line 28, for "of" read -- or --; column 5, line 4, for "media" read -- medial --.

Signed and sealed this 4th day of August 1964.

(SEAL)
Attest:

ERNEST W. SWIDER
Attesting Officer

EDWARD J. BRENNER
Commissioner of Patents